Figure 1:
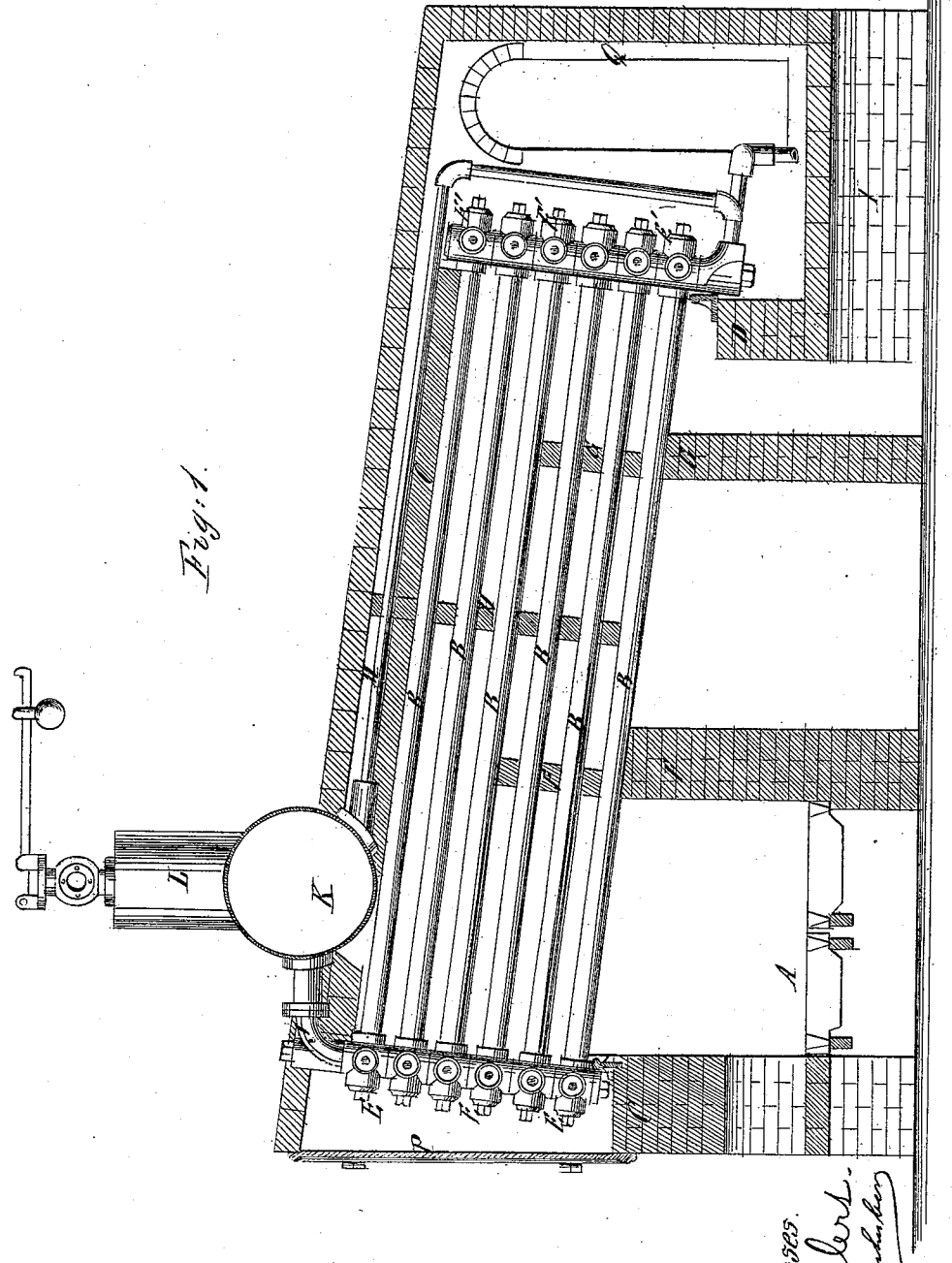

4 Sheets—Sheet 1.

J. GRIFFITH & G. W. WUNDRAM.
SECTIONAL STEAM GENERATOR.

No. 108,703. Patented Oct. 25, 1870.

4 Sheets—Sheet 2.
J. GRIFFITH & G. W. WUNDRAM.
SECTIONAL STEAM GENERATOR.
No. 108,703.           Patented Oct. 25, 1870
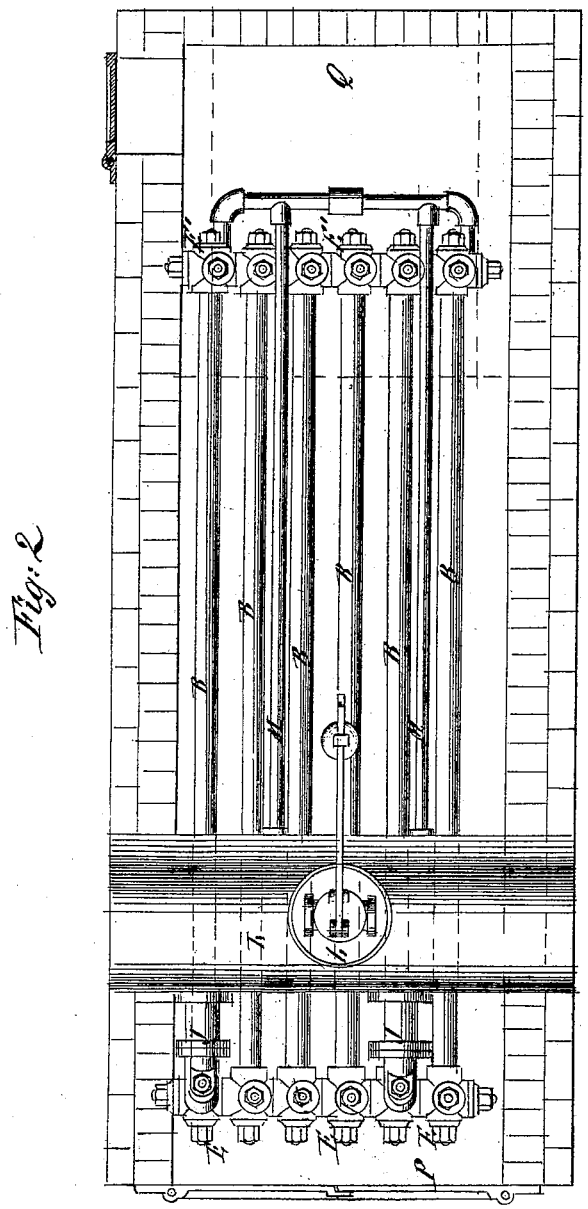

4 Sheets—Sheet 3.
J. GRIFFITH & G. W. WUNDRAM.
SECTIONAL STEAM GENERATOR.
No. 108,703. Patented Oct. 25, 1870.
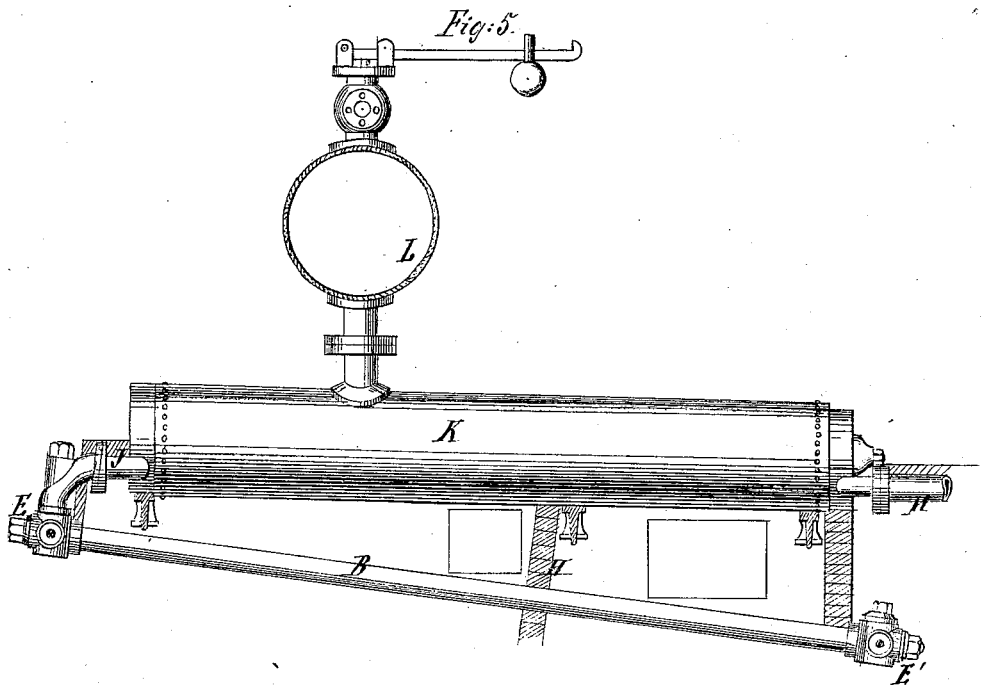
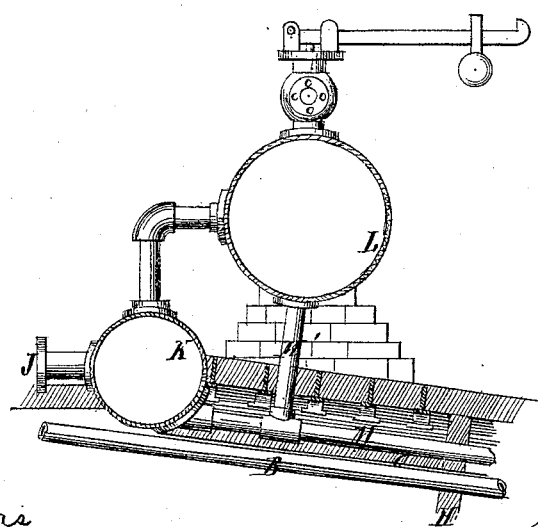
Witnesses.
L. Wahlers
E. F. Kastenhuber
Inventors.
John Griffith
G. W. Wundram
Van Santvoord & Hauff
Attys 4 Sheets—Sheet 4
J. GRIFFITH & G. W. WUNDRAM.
SECTIONAL STEAM GENERATOR.
No. 108,703. Patented Oct. 25, 1870.
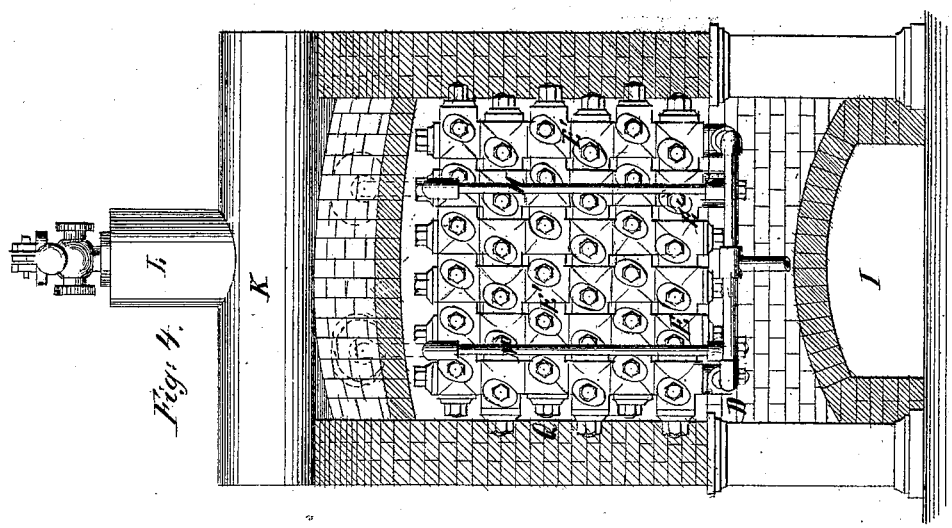
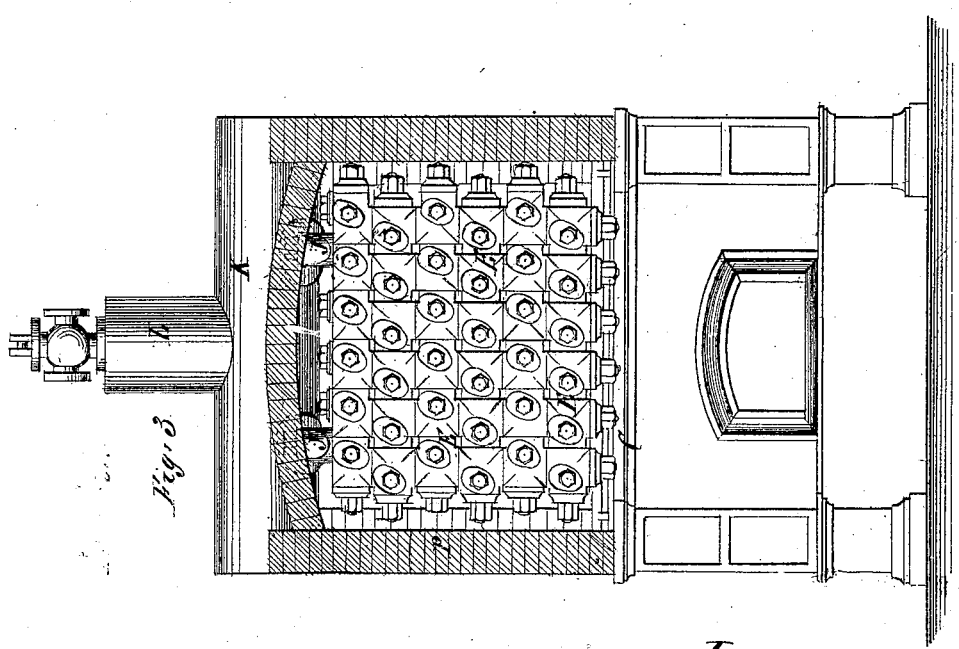

UNITED STATES PATENT OFFICE.

JOHN GRIFFITH AND GEORGE W. WUNDRAM, OF NEW YORK, N. Y.

IMPROVEMENT IN SECTIONAL STEAM-GENERATORS.

Specification forming part of Letters Patent No. 108,703, dated October 25, 1870.

*To all whom it may concern:*

Be it known that we, JOHN GRIFFITH and GEORGE W. WUNDRAM, both of the city, county, and State of New York, have invented a new and useful Improvement in Sectional Steam-Boilers; and we do hereby declare the following to be a full, clear, and exact description thereof, which will enable those skilled in the art to make and use the same, reference being had to the accompanying drawings, forming part of this specification, in which drawings—

Figure 1 is a longitudinal vertical section of this invention. Fig. 2 is a plan or top view of the same. Fig. 3 is a front view of the same. Fig. 4 is a rear view of the same. Figs. 5 and 6 are modifications of the same.

Similar letters of reference indicate corresponding parts.

This invention consists in the arrangement of one or more circulation-pipes extending from the bottom part of the drum on the top of a sectional boiler down to the rear heads, in combination with one or more pipes, forming a connection between the highest row of front heads and the drum in such a manner that a constant circulation of the water takes place from the hottest part of the boiler through the drum to the coolest part of the boiler, and by these means a uniform distribution of the heat is effected and the strain on the boiler is materially reduced. The circulation-pipe is protected against the direct action of the fire by an arch situated below it, so as to prevent the generation of steam in said circulation-pipe. The heads in the rear part of the boiler, and also those parts of the circulation pipe or pipes extending downward to said heads, are protected against coming in contact with the cold external air by an inclosure or air-space, to which access is had through a door, and a similar inclosure protects the heads and that part of the circulation-pipes situated on the front of the boiler, so that while said circulation-pipes and heads are not exposed to the fire they are prevented from being cooled down by coming in contact with external air. The air-chamber in the rear of the boiler is situated over the smoke-flue, so that the air in said chamber becomes heated by the action of the fire.

In the drawings, the letter A designates the fire-place of our boiler, over which are placed the water-pipes B, which rest in front on the wall C and in the rear on the wall D, and which are connected by heads E E', in the manner described in Letters Patent No. 98,490. The fire rising from the fire-place passes through between the water-pipes B in a zigzag course, being compelled to do so by the bridge-walls F G and partition-walls H, and the gaseous products of combustion escape through the flue I into the smoke-stack. The heads E E' are situated outside of the walls C D, so that they are not exposed to the direct action of the fire, and the pipes B are placed in an inclined position, as shown in Fig. 1, the heads E in front of the boiler being on a higher level than the corresponding heads, E', in the rear. The top row of the front heads, E, connects by one or more pipes, J, with a drum, K, from which rises the steam-dome L, and from the lowest part of which extend two or more pipes, M, connecting with the rear heads, E'. A partition-wall, O, protects the pipes M against the direct action of the fire. By these means a circulation of the water is effected from the top row of the front heads through the drum back to the rear heads, and a more uniform distribution of heat throughout the entire boiler is effected, and thereby the strain on the various parts of the boiler, due to an unequal distribution of heat, is materially reduced. The partition-wall O prevents the formation of steam in the pipes M, which would have a tendency to check the circulation of the water through said pipes. The front heads, E, and the pipes J are protected by an inclosure or air-chamber, P, to which access is had through suitable doors, so that while said heads are not exposed to the direct action of the fire the external air is prevented from cooling them down, and at the same time free access is had to the same for the purpose of cleaning or repairing the water-pipes. A similar air-chamber, $Q_1$ protects the rear heads, E', and the upright branches of the circulation-pipes M.

It is obvious that our circulation-pipes can be applied to a drum situated transversely to the water-pipes, as shown in Figs. 1, 2, 3, 4, and 6, or to a drum which extends in the direction of the length of the water-pipes, as shown in Fig. 5. In some cases we also make the steam-dome detached from the drum, as shown in Fig. 6, and in this case branch pipes M' extend from the bottom part of said steam-dome to the circulation-pipes M, so as to carry the water which may result from the condensation of the steam in the dome back into the water-space of the boiler.

The air-chamber Q is situated over the smoke-flue I, only separated therefrom by a thin wall, so that the air in such air-chamber is heated by the action of the fire, and the air-space Q may be used as a drying-chamber for wood or for the fuel to be used in generating steam.

What we claim as new, and desire to secure by Letters Patent, is—

1. The circulation-pipes M, protected by and situated between the wall O and the furnace-crown, in combination with the top row of the front heads, E, with the drum K, and with the rear heads, E', of a sectional steam-boiler, substantially as shown and described.

2. The air-chambers P Q, in combination with the circulation-pipes J M, substantially as set forth.

3. The air-chamber Q, in combination with the smoke-flue I and with a steam-boiler furnace, A, constructed and operating substantially in the manner shown and described.

4. The partition-wall O, protecting the circulation-pipes M against the direct action of the fire, substantially as described.

This specification signed by us this 25th day of June, 1870.

JOHN GRIFFITH.
G. W. WUNDRAM.

Witnesses:
W. HAUFF,
E. F. KASTENHUBER.